(12) United States Patent
Willetts

(10) Patent No.: US 7,913,403 B1
(45) Date of Patent: Mar. 29, 2011

(54) RECIPROCATING PRUNING SAW

(76) Inventor: Peter Douglas Willetts, Inverness, CA (US)

(*) Notice: Subject to any disclaimer, the term of this patent is extended or adjusted under 35 U.S.C. 154(b) by 584 days.

(21) Appl. No.: 11/805,759

(22) Filed: May 23, 2007

Related U.S. Application Data

(60) Provisional application No. 60/812,862, filed on Jun. 8, 2006.

(51) Int. Cl.
*B27B 3/40* (2006.01)

(52) U.S. Cl. .......... 30/392; 30/166.3; 30/296.1; 30/383; 464/172

(58) Field of Classification Search .................. 30/166.3, 30/196.1, 392, 500, 296.1; 464/162, 172
See application file for complete search history.

(56) References Cited

U.S. PATENT DOCUMENTS

| | | | | |
|---|---|---|---|---|
| 2,713,271 A | * | 7/1955 | Dodegge ........................... | 74/50 |
| 2,881,519 A | * | 4/1959 | Gardner .......................... | 30/122 |
| 3,158,933 A | * | 12/1964 | Davis et al. ...................... | 30/276 |
| 3,657,813 A | * | 4/1972 | Knight ............................ | 30/373 |
| 3,715,805 A | * | 2/1973 | Fraser ........................... | 30/166.3 |
| 4,654,971 A | * | 4/1987 | Fettes et al. ..................... | 30/383 |
| 4,733,471 A | * | 3/1988 | Rahe ............................... | 30/276 |
| 4,841,643 A | * | 6/1989 | Colella et al. .................. | 30/500 |
| 4,899,446 A | * | 2/1990 | Akiba et al. ..................... | 30/276 |
| 5,013,282 A | * | 5/1991 | Keller ........................... | 464/172 |
| 5,926,961 A | * | 7/1999 | Uhl ............................. | 30/296.1 |
| 6,006,434 A | * | 12/1999 | Templeton et al. ........... | 30/296.1 |
| 6,474,747 B2 | * | 11/2002 | Beaulieu et al. ............. | 30/296.1 |
| 7,484,300 B2 | * | 2/2009 | King et al. .................... | 30/296.1 |
| 7,578,744 B2 | * | 8/2009 | Park ............................. | 464/162 |

\* cited by examiner

*Primary Examiner* — Hwei-Siu C Payer
(74) *Attorney, Agent, or Firm* — Risto A. Rinne, Jr.

(57) ABSTRACT

An apparatus for the cutting of tree limbs includes an extensible drive shaft that is detachably-attachable at one end to a portable electric drill and is secured to a housing at an opposite end thereof. The housing converts the rotary motion that is supplied by the drill into reciprocating motion of a saw blade and it disposes the saw blade at an angle with respect to the drive shaft that is slightly less than 90 degrees. An extensible two-part cylindrical outer sleeve covers the drive shaft and is detachably-attached at one end thereof to the drill and at an opposite end to the housing. A hook is provided in the housing and is used to grab and urge severed limbs where desired. An optional clamping mechanism is attached to the housing and is used initially to urge the blade and the limb toward each other during cutting and then to retain the limb proximate the housing after it has been cut for controlled placement and safe release of the limb.

3 Claims, 9 Drawing Sheets

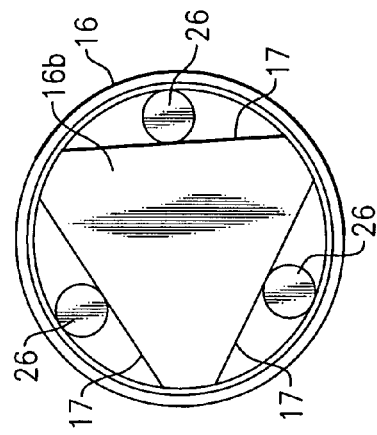
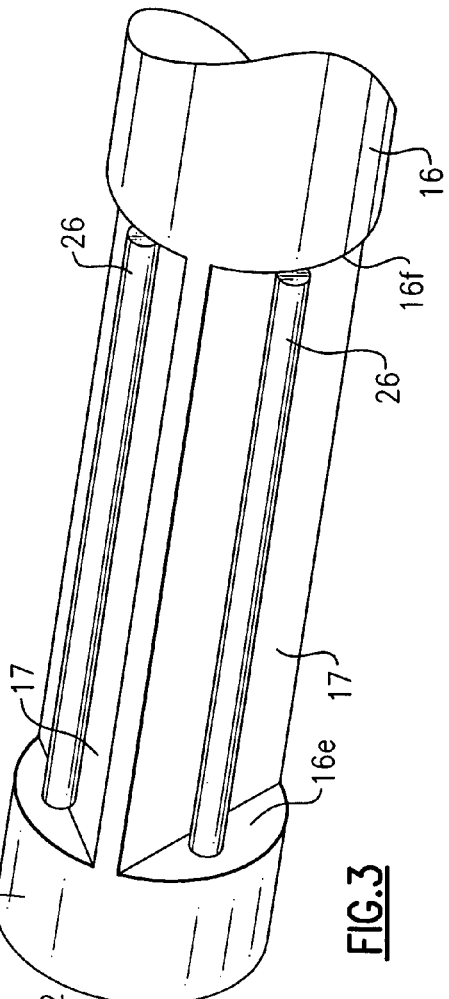
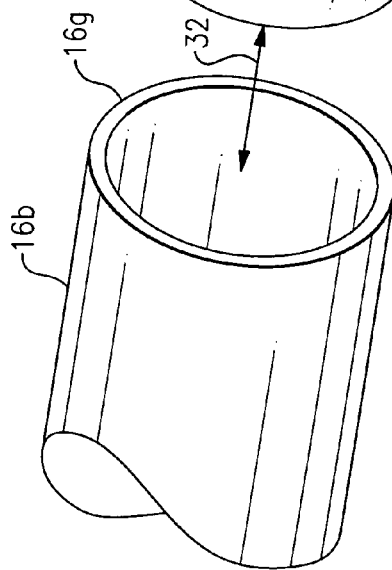

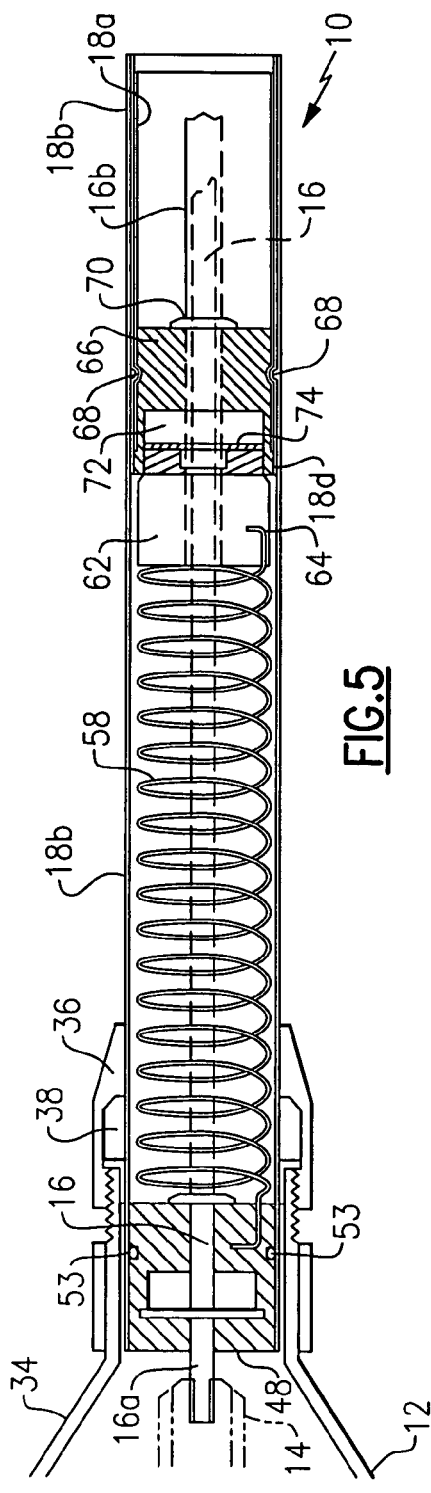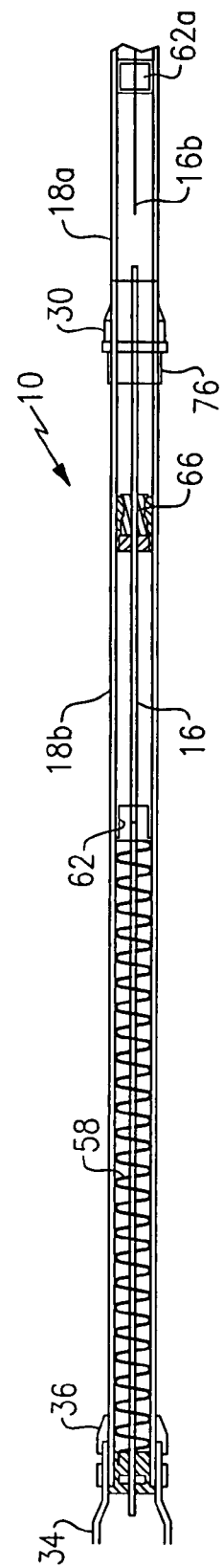
FIG.5
FIG.6

RECIPROCATING PRUNING SAW

This patent application claims the Benefit of Priority of Provisional Patent Application Ser. No. 60/812,862 that was filed on Jun. 8, 2006 by the same inventor, Peter Douglas Willetts and entitled "Reciprocating Pruning Saw".

BACKGROUND OF THE INVENTION

1. Field of the Invention

The present invention, in general, relates to saws used for the cutting of timber and, more particularly, to pruning saws for the cutting of branches.

Pruning saws are well-known. They are used to cut limbs and small branches off of trees, shrubs, and bushes; a process that is often generally referred to as "limbing". The limbs (i.e., branches) that are to be cut are generally disposed at an elevated position above a person (i.e., operator) who is standing on the ground while cutting them.

This, in turn, requires the user to extend a cutting blade sufficiently far away from the operator to make contact with the limb. The pruning saw provides this reach and allows the operator to place the cutting blade on the limb where a cutting of it is desired.

Operators who prune trees commercially will use customized equipment that allows them to better access the limbs. They may use an extendible mobile platform, sometimes referred to as a "cherry picker" to reach the limbs. A chainsaw is then commonly used to cut the limbs.

Homeowners and more occasional users (i.e., those who have a need to prune a number of limbs but not to the extent that a commercial tree service user might have) do not have access to the extendible mobile platforms and many people feel especially uncomfortable when using a chainsaw.

Alternately, commercial pruning operators will climb into the trees that are to be pruned, often carrying a chainsaw with them. They typically wear a safety harness and use additional gear to help prevent a possible fall from occurring.

Homeowners and the more occasional user are not apt to feel comfortable climbing trees nor are they likely to have the requisite safety gear.

To satisfy the pruning needs of the homeowner or the more occasional user, a certain common type of pruning saw is used that includes a fixed-position saw blade that is attached at an end of a pole. The pole may or may not be extensible. If the pole is extensible, its overall length can be varied within a narrow range. Therefore, the saw blade can be disposed a variable distance from a user within the length of the pole.

After extending the blade a desired amount and placing the saw blade where desired on the limb, the user then manually reciprocates the entire pole back and forth while maintaining the saw blade in the desired position. The saw blade, being attached to the pole, also reciprocates. It generally only cuts during a cutting stroke portion of the cycle that draws the blade (and pole) back toward the user. It does not cut during the opposite (i.e., retraction) stroke unless the blade is of a special type that cuts in both directions.

A first disadvantage of this type of pruning saw is that a greater mass, specifically the entire combined mass of the pole and the saw blade, must be reciprocated in order to sever (i.e., saw through) the limb. This, therefore, substantially increases the amount of physical work that is required.

Consequently the user is apt to become quickly fatigued. Because of this, these types of pruning saws are generally used for highly intermittent, light-duty, pruning needs where only a few limbs are to be cut at any given time.

For the typical homeowner or occasional operator, having to use a fixed-blade type of pruning saw to sever more than a few limbs at any given time is too tiring to accomplish. However, many homeowners have a great many trees, shrubs, and bushes that require periodic limbing. In particular, overhead limbs on fruit trees or limbs on other types of shade or decorative trees may require tens or even hundreds of limbs to be pruned at a time, for example, annually.

Fixed-blade, pole-mounted pruning saws are impractical whenever a large number of limbs require pruning yet they have been the only close-to-practical option available for the homeowner or occasional user. This is primarily because of the low cost of fixed blade pruning saws. Another reason for their popularity is that they are easy to use and therefore very little skill or training is required in order to use them.

Another disadvantage of fixed-blade, pole mounted pruning saws is that it takes a long time to sever each limb. As mentioned earlier, the entire pole and blade together must be manually reciprocated. Because of the large mass involved, the repetition rate is low, typically only about one stroke per second, at best. This makes each cut especially slow to accomplish. This, combined with the fatigue factor mentioned above, make these types of pruning saws impractical for all but the smallest of jobs.

The only known way to extend the reach of such types of pruning saws is to add, for some models, an extension segment at the bottom of the pole that increases its overall length. However, while this increases the overall reach it has no effect on the extensible portion. It increases the total mass which makes cutting that much the slower to accomplish.

There is another general disadvantage of fixed-blade pole-mounted pruning saws and also of other types of pruning saws, including motor driven types, and that disadvantage relates to the angle of the blade with respect to a remaining portion of the saw. Typically, a longitudinal axis of the blade of the pruning saw is nearly parallel with a longitudinal axis of the pole (or main body) of the pruning saw.

It is also preferred to have the longitudinal axis of the blade nearly horizontal during cutting of the limb so that gravity supplies at lease some of the force that urges (i.e., maintains) the blade in contact with the limb during its cutting.

Accordingly, when attempting to limb a branch that is directly overhead, the user must stand underneath the limb or nearly so. This results in three substantial additional disadvantages.

First, the longitudinal axis of the linear blade (the blade may not be linear and can include a slightly concave cutting surface) tends to be disposed very nearly vertical during a cutting of the limb. As the operator (i.e., user) progresses with a cutting of the limb, the limb begins to sag downward under the pull of gravity. As it sags, it begins to pinch the lower portion of the saw blade. This increasingly makes it difficult for the user to force the pinched saw blade up and down to continue cutting.

A second difficulty encountered by a nearly vertical saw blade is that in order for the blade to actually cut the limb, the cutting teeth of the blade must be urged into contact with the limb and held in contact with the limb under pressure during cutting. When the saw blade is nearly vertical, the operator must supply virtually all of the force necessary to maintain the blade in contact with the limb throughout the cutting of the limb. This is also fatiguing.

When the limb, as mentioned above, begins to sag and pinch the saw blade it becomes increasingly difficult for the user to supply the force necessary to maintain the cutting edge of the saw blade, under pressure, in contact with the limb.

A third difficulty encountered by a nearly vertical pruning saw blade is that when the limb is finally severed, it falls downward toward the operator. Clearly, this is dangerous.

Even if the operator is able to stand slightly off to the side with respect to a directly vertical fall-line of the limb (i.e., in line with gravity), there is still considerable danger to the operator. This is because the limb itself typically has branches that extend outward from a main trunk of the limb that is being severed. As the severed limb falls, the limb can rotate thereby disposing some of its longer branches over the operator as the limb continues to fall.

Some of these longer branches may not have even been visible to the operator because they were disposed above the limb during its cutting. In an original overhead position, the weight of these branches that are attached to the limb can cause them to sag downward toward the main trunk. An initial upward glance, if they were spotted, would cause them to appear smaller than they are and to not pose a risk of striking the operator.

But as the severed limb falls and rotates, these branches cease to sag as gravity ceases to pull them closer toward the main trunk of the falling limb. Accordingly, they extend further away from the main trunk of the limb where they pose an ever increasing hazard of impacting the operator as the severed limb falls.

Additionally, as the limb falls it may increase its rate of rotation about a longitudinal axis of the main trunk. Whenever such rotation occurs, centrifugal force also occurs. The centrifugal force, then, further urges the limb branches away from the main trunk of the falling limb. This extends the distance the branches are disposed away from the main trunk of the limb which, in turn, further increases their risk of striking the operator.

Clearly, there are many disadvantages that arise when an operator is disposed too close under a limb that is being severed. Accordingly, there is a need for an operator to stand even further away from the line of gravity that extends downward from a limb that is being severed.

With all of these substantial disadvantages, one might wonder why they are so popular. These types of fixed-blade pruning saws are reasonably priced and they are also generally light in weight. Also, the disadvantages as mentioned herein, are not generally known until after they have been purchased and used.

Certain types of motor-driven pruning saws could help ameliorate some of these difficulties, yet they tend to be heavy and expensive. This is because the user must purchase both the saw blade, motor, and drive mechanism. Of these, the motor tends to be especially expensive. It is desirable to provide for a homeowner or occasional user a motorized pruning saw when a greater number of limbs are to be severed that was less expensive than currently available models. If such a saw could be adapted for use with an external type of motor common to most households, such as is found on an electric drill to supply the motive force, it would be beneficial. A lower cost motorized pruning saw would be provided.

Another disadvantage of known types of motorized pruning saws is that the drive mechanism to supply power to the blade is generally heavy. Also, prior art types of motorized pruning saws either do not allow for extensible range (i.e., reach) or they are heavy, expensive, difficult to use, dangerous to use, or otherwise impractical for the homeowner or occasional user.

Prior art types of motorized pruning saws also fail to orient the longitudinal axis of the blade at a near horizontal position. This position is ideal during cutting because it maintains downward force on the blade and also because it helps dispose the operator a safe distance away from the line of gravity. However, in order for this to occur the reach must be variable because the safe-operating distance that the user (operator) must stand off from the line of gravity increases with the height of the limb that is being severed.

Prior motorized types of pruning saws do not have variable support for a driven member (i.e., a drive shaft) that is intermediate the distal ends. Typically, a support (such as a bearing) is provided at each opposite end. The shaft when under torque during cutting is apt to bend and can contact an interior of an outer protective shaft. This causes wear, damage, and excess noise, each of which further contribute to user fatigue.

It is especially desirable to include an intermediate support for a drive shaft of a pruning saw that prevents it from bending and contacting an interior of the outer protective shaft.

It is also desirable to vary the location of the intermediate support based on the degree of extensibility that is needed. For example, if an overall length of a motorized extensible pruning saw that included an extensible shaft drive was minimal, perhaps six feet in overall length, then an ideal position for the intermediate support of the shaft drive would be disposed at three feet, or about one-half of the overall length of the extensible portion.

If, however, the extensible pruning saw were extended to about ten feet of overall length then an ideal position for the intermediate support would be at five feet, again at about one-half of the effective length of the shaft drive. This is important because if the intermediate support remained at three feet then an unsupported remaining span of seven feet would exist. It is probable that under the increased torque that occurs during cutting (i.e., under load), the centrally disposed shaft drive would bend and possibly contact an interior of the outer shaft.

Even if the shaft failed to actually contact with an interior of the outer shaft, the arc where it bends introduces an eccentric by shifting mass to one side. This, in turn, causes vibration to occur. Vibration interferes with blood flow and can hasten the onset of fatigue.

The only two prior art known ways to prevent this from happening include increasing the inside diameter of the outer shaft to provide more room for the shaft drive to flex (i.e., bend) therein without contacting the interior of the outer shaft or to increase the rigidity of the shaft drive or both. Any of these approaches increase the overall weight of the tool (pruning saw). It is desirable that the pruning saw be as lightweight as possible to reduce operator fatigue.

No known prior art type of an extensible pruning saw includes a shaft drive (i.e., a motorized type of pruning saw) that is capable of providing an intermediate support that can vary its position relative to the amount that a variable extensible drive member has been extended or retracted.

Also, as mentioned hereinbefore, some limbs may be disposed at a greater height than any current type of extensible pruning saw can reach. There is a need to be able to provide a pruning saw with a greater maximum length of reach.

Also, when sawing limbs it is important to keep the teeth of the saw blade in contact with the limb and to do so while maintaining an ideal force that helps maximize the speed of cutting yet which does not needlessly add resistance to the blade.

A slight urging of the teeth of the blade into contact with the limb increases the rate of cutting that is occurring. Too much urging of the teeth into contact with the limb adds increased resistance during both the cutting stroke and also during the retraction stroke (i.e., when the blade is not cutting the limb) which decreases the rate of cutting that is occurring.

Also, when a limb overhead has been severed with a prior art type of pruning saws it falls as gravity dictates. Accordingly, it can at times descend like a sharpened spear toward the ground posing a severe risk of injury to the user as well as to any children, pets, or other bystanders.

Alternately, the limb can fall into a mass of branches and become stuck. Later, perhaps during a storm, it can fall unexpectedly again posing a severe risk of injury. There remains a need to control the severed limb, to direct it where desired, and to release it to fall only when the user is certain that it is safe underneath.

The need for control of the severed limb and the need to maintain cutting pressure on the limb during a cutting thereof are long-standing problems that have not heretofore been solved.

Also, electric motors—whether powered by 120 VAC or battery, are generally expensive devices. If such a device must be included as a component part of a reciprocating pruning saw, then the cost of the product is substantially increased. It is desirable to provide a motorized type of a reciprocating pruning saw that does not include its own electric motor, but rather is adapted for use with a common type of electric motor that the vast majority of homeowners, tradesmen, and contractors already have and that is a portable electric drill.

Accordingly, it is also desirable to be able to provide a method for securing the reciprocating pruning saw to the electric drill that is effective, easy to use, and adapted for use with as many different models and types of electric drills as possible with a minimum number of different customized interfaces.

Accordingly, there exists today a need for a reciprocating pruning saw that helps to ameliorate the above-mentioned problems and difficulties as well as help to ameliorate those additional problems and difficulties as may be recited in the "OBJECTS AND SUMMARY OF THE INVENTION" or discussed elsewhere in the specification.

Clearly, such an apparatus would be a useful and desirable device.

2. Description of Prior Art

Saws are, in general, known. For example, the following patents describe various types of these devices:

U.S. Pat. No. 6,820,339 to Albrightson, that issued on Nov. 23, 2004;

U.S. Pat. No. 6,651,348 to Steinmann, that issued on Nov. 25, 2003;

U.S. Pat. No. 6,264,211 to Granado, that issued on Jul. 24, 2001;

U.S. Pat. No. 5,755,293 to Bourke, that issued on May 26, 1998;

U.S. Pat. No. 5,595,250 to Bourke, that issued on Jan. 21, 1997;

U.S. Pat. No. 5,566,768 to Bourke, that issued on Oct. 22, 1996;

U.S. Pat. No. 5,607,265 to Lane, that issued on Mar. 4, 1997;

U.S. Pat. No. 5,185,934 to Tillman, that issued on Feb. 16, 1993;

U.S. Pat. No. 4,949,463 to Chen, that issued on Aug. 21, 1990;

U.S. Pat. No. 4,841,643 to Colela et al., that issued on Jun. 27, 1989;

U.S. Pat. No. 4,712,983 to Moynihan, that issued on Dec. 15, 1987;

U.S. Pat. No. 4,268,966 to Williams, that issued on May 26, 1981;

U.S. Pat. No. 3,755,896 to Tommerup, that issued on Sep. 4, 1973;

U.S. Pat. No. 2,881,519 to Gardner, that issued on Apr. 14, 1959;

U.S. Pat. No. 2,793,661 to Olson, that issued on May 28, 1957;

U.S. Pat. No. 2,713,271 to Dodegge, that issued on Jul. 19, 1955;

U.S. Pat. No. 2,631,619 to Folli, that issued on Mar. 17, 1953;

U.S. Pat. No. 2,621,685, to Butz, that issued on Dec. 16, 1952;

U.S. Pat. No. 2,211,741 to Elwell, that issued on Aug. 13, 1940; and

U.S. Pat. No. 1,481,055 to Fullbright, that issued on Jan. 15, 1924.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a reciprocating pruning saw that lessens fatigue.

It is also an important object of the invention to provide a reciprocating pruning saw that does not require an operator to manually urge the cutting blade back and forth.

Another object of the invention is to provide a reciprocating pruning saw that is lightweight.

Still another object of the invention is to provide a reciprocating pruning saw that is motor operated.

Still yet another object of the invention is to provide a reciprocating pruning saw that includes an extensible length.

Yet another important object of the invention is to provide a reciprocating pruning saw that permits extending the length of the saw (i.e., reach) within a greater range.

Still yet another important object of the invention is to provide a reciprocating pruning saw that is inexpensive to manufacture and therefore more affordable to the homeowner or occasional user.

A first continuing object of the invention is to provide a reciprocating pruning saw that includes a telescoping drive that is inexpensive to manufacture.

A second continuing object of the invention is to provide a reciprocating pruning saw that includes a telescoping drive that is lightweight.

A third continuing object of the invention is to provide a reciprocating pruning saw that includes a telescoping drive that maintains a drive portion of the shaft in alignment with a driven part of the shaft.

A fourth continuing object of the invention is to provide a reciprocating pruning saw that includes a telescoping drive that permits the removal of a driven part of the shaft from the saw and replacement with a driven part that includes a different length.

A fifth continuing object of the invention is to provide a reciprocating pruning saw that includes a center bearing support for a telescoping drive mechanism.

A sixth continuing object of the invention is to provide a reciprocating pruning saw that includes a center bearing support for a telescoping drive mechanism which varies its position along a longitudinal length of the drive mechanism in proportion to the amount of extension by the drive mechanism so as to optimally maintain the center bearing support proximate a center of the overall combined length of the drive mechanism.

A seventh continuing object of the invention is to provide a reciprocating pruning saw that is adapted for use with a battery operated electric drill.

An eighth continuing object of the invention is to provide a reciprocating pruning saw that is adapted for use with an electric drill.

A ninth continuing object of the invention is to provide a reciprocating pruning saw that provides a hook for grapping severed limbs and urging them where desired.

A tenth continuing object of the invention is to provide a reciprocating pruning saw that includes a device for maintaining the saw in contact with a limb during a cutting thereof.

An eleventh continuing object of the invention is to provide a reciprocating pruning saw that includes a device that can permit a user to regulate the pressure that exists between a blade and a limb during cutting of the limb.

A twelfth continuing object of the invention is to provide a reciprocating pruning saw that includes a device that urges the limb and the blade together during cutting of the limb and which secures the limb to the saw proximate the blade after cutting is completed.

A thirteenth continuing object of the invention is to provide a reciprocating pruning saw that is safer to use.

A fourteenth continuing object of the invention is to provide a reciprocating pruning saw that allows an operator (user) to stand off to the side of an overhead limb that is being severed.

A fifteenth continuing object of the invention is to provide a reciprocating pruning saw that can cut a limb in less time than a fixed-blade type of pruning saw.

A sixteenth continuing object of the invention is to provide a reciprocating pruning saw that is suitable for light to moderate duty limbing jobs.

A seventeenth continuing object of the invention is to provide a reciprocating pruning saw that maintains a longitudinal axis of a cutting blade nearly horizontal during cutting of an overhead limb while permitting a user to stand off to the side from a center line of gravity of the limb.

An eighteenth continuing object of the invention is to provide a reciprocating pruning saw that includes a protective outer housing that covers a drive and a driven shaft.

A nineteenth continuing object of the invention is to provide a reciprocating pruning saw that includes a protective outer housing that secures to a portion of a portable drill.

A twentieth continuing object of the invention is to provide a reciprocating pruning saw that includes a drive shaft that secures to a drill chuck of a portable drill.

A twenty-first continuing object of the invention is to provide a reciprocating pruning saw that includes a protective outer housing which secures to a portion of a portable drill and a drive shaft that secures to a drill chuck of a drill, thereby maintaining the pruning saw in position relative to the drill.

A twenty-second continuing object of the invention is to provide a reciprocating pruning saw that includes a clamping mechanism which is used to continually apply pressure to urge a saw blade into contact with a limb during a cutting thereof.

A twenty-third continuing object of the invention is to provide a reciprocating pruning saw that includes a clamping mechanism which is used to retain a severed limb proximate to a housing after it has been cut for removal from the tree or bush and for precise control of its release.

A twenty-fourth continuing object of the invention is to provide a reciprocating pruning saw that includes a clamping mechanism which includes an upper jaw that is spring loaded to be normally disposed above the teeth of a saw blade and a lower jaw that is urged upward toward the teeth when actuated by a user.

A twenty-fifth continuing object of the invention is to provide a reciprocating pruning saw that includes an extensible drive mechanism which permits a driven shaft to be disposed inside of a drive shaft and wherein the driven shaft is adapted to extend or retract longitudinally within the drive shaft and wherein rotary power is transferred to the driven shaft by the drive shaft regardless of its position in the drive shaft.

A twenty-sixth continuing object of the invention is to provide a reciprocating pruning saw that includes an extensible drive mechanism which permits a driven shaft to be disposed inside of a drive shaft and wherein the driven shaft is adapted to extend or retract longitudinally within the drive shaft and wherein rotary power is transferred to the driven shaft by the drive shaft regardless of its position in the drive shaft and wherein rotary power is transferred to the driven shaft by the drive shaft regardless of the direction of rotation by the drive shaft.

A twenty-seventh continuing object of the invention is to provide a reciprocating pruning saw that converts rotary motion of a drill into reciprocating motion of a saw blade when the drill is rotating in a clockwise direction and also in a counter-clockwise direction.

A twenty-eighth continuing object of the invention is to provide a reciprocating pruning saw that secures to a nose portion of a drill sufficient to secure the reciprocating pruning saw to the drill wherein a lower portion of an adjustable outer sleeve is prevented from rotating with respect to a longitudinal axis of a drill chuck of the drill, and wherein the lower portion of the adjustable outer sleeve is prevented from extending away from the drill along the longitudinal axis of the drill during use (i.e., cutting) of the reciprocating pruning saw.

Briefly, a reciprocating pruning saw that is constructed in accordance with the principles of the present invention has an extensible drive shaft that is detachably-attachable at one end to a portable electric drill and is secured to a housing at an opposite end thereof. The housing converts the rotary motion that is supplied by the drive shaft into reciprocating motion of a saw blade and it disposes the saw blade at an angle with respect to the drive shaft that is slightly less than 90 degrees. The extensible drive shaft extends to vary the amount the housing is disposed away from the drill. An outer sleeve that covers the drive shaft is detachably-attached at one end to the drill and at an opposite end to the housing. The outer sleeve is also extensible. A hook that is used to grab and urge severed limbs where desired is attached to the housing at an opposite end that the saw blade is attached. An optional clamping mechanism is attached to the housing and is used initially to urge the blade into the limb during cutting and to retain the limb after it has been cut for controlled placement and release of the limb.

BRIEF DESCRIPTION OF THE DRAWINGS

FIG. 2 is a cross sectional view taken on the line 2-2 in FIG. 1.

FIG. 3 is a cross sectional view taken on the line 3-3 in FIG. 1 with a drive shaft pulled out of a driven shaft.

FIG. 5 is a side view in cross section of the lower portion of the reciprocating pruning saw of FIG. 4 with the reciprocating pruning saw in a retracted position.

FIG. 6 is a side view in cross section of the lower portion of the reciprocating pruning saw of FIG. 4 with the reciprocating pruning saw in an extended position.

DETAILED DESCRIPTION OF THE INVENTION

Figure 1:
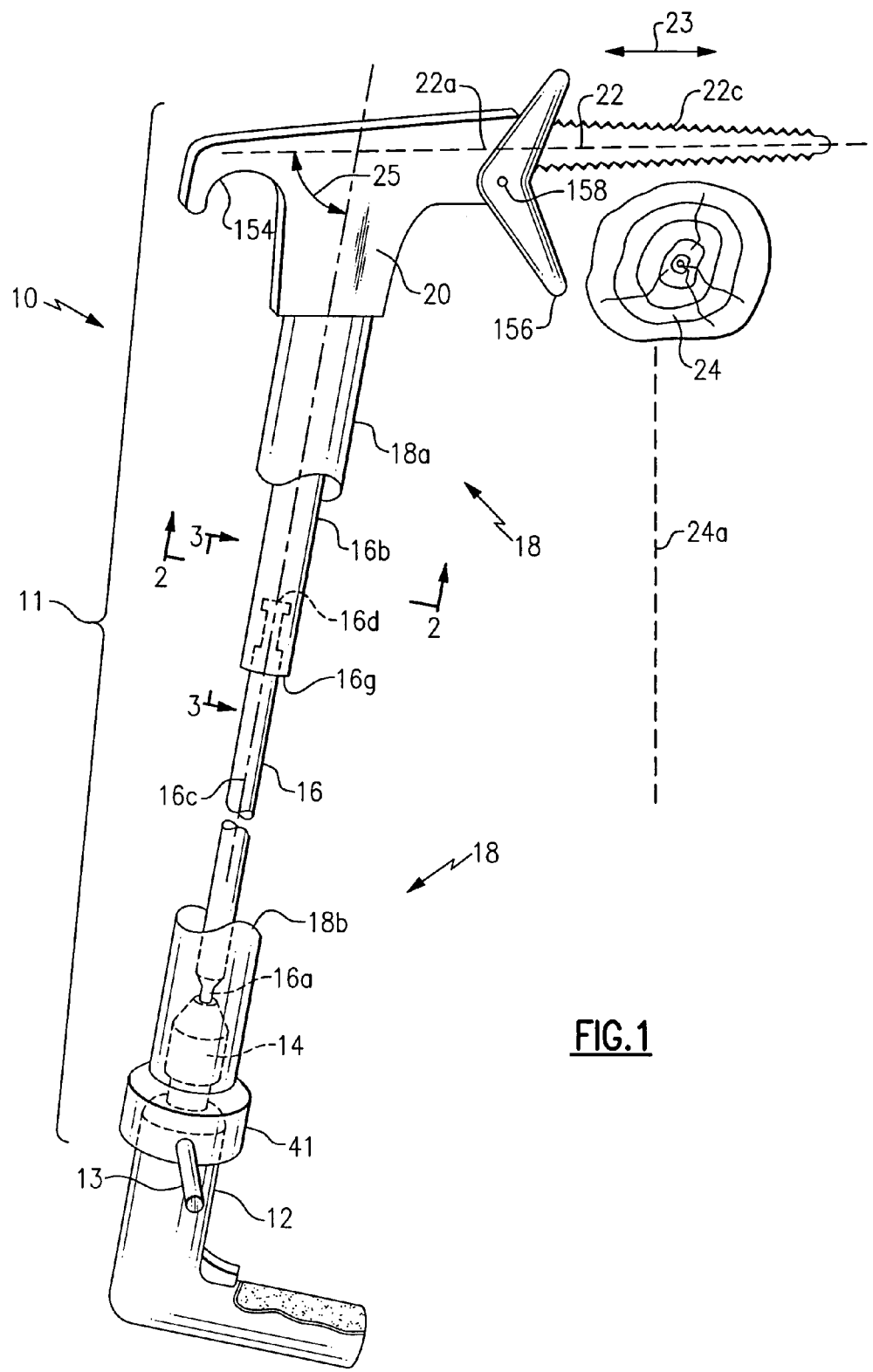
FIG. 1 is a view in perspective of a basic version of a reciprocating pruning saw attached to a portable battery operated electric drill.

Referring to all of the drawings and initially primarily to FIGS. 1-3 is shown, a reciprocating pruning saw, identified in general by the reference numeral 10. Bracket 11 (with the exception of a drill handle 13) identifies that portion of the instant invention that is included with the reciprocating pruning saw 10.

A portable battery powered electric drill 12 is supplied by a user (not shown) and it includes a drill chuck 14 that is normally used to secure drill bits to the drill 12. This is well known in the drill art field.

The drill chuck 14 attaches to first end 16a of a drive shaft 16. The drive shaft 16 supplies power to rotate, in turn, a driven shaft 16b.

An adjustable outer sleeve 18 covers all rotating parts. A center portion of the outer sleeve 18 has been removed from the view to better show detail of the drive shaft 16 and the driven shaft 16b.

A housing 20 is provided at a distal end and is used to convert rotary motion by the driven shaft 16b into reciprocating motion by a saw blade 22, as shown by arrow 23. The housing 20 is described in greater detail hereinafter. The saw blade 22 includes a center longitudinal axis 22a.

A limb 24 is shown disposed under the cutting teeth of the saw blade 22. A gravity centerline 24a (dashed line) extends downward toward a ground surface under the limb 24.

The housing 20 also disposes the center longitudinal axis 22a of the saw blade 22 at an angle 25 with respect to a second center longitudinal axis 16c of the drive shaft 16. The angle 25 is greater than 45 degrees and is also less than 90 degrees. About 70 degrees is generally preferred.

It is important to note that the center longitudinal axis 22a of the saw blade 22 is generally disposed at or very nearly horizontal with respect to a ground surface that is disposed under the limb 24. This position is ideal because the saw blade 22 does not bind in the limb 24 as the limb is severed. Also, the user can allow a portion of the weight of the reciprocating pruning saw 10 and drill 12 to bear on the limb 24, thereby helping to maintain the cutting teeth of the saw blade 22 in contact with the limb 24.

It is also important to note that the center longitudinal axis 22a of the saw blade 22 is generally disposed at or very nearly horizontal with respect to a ground surface that is disposed under the limb 24. It is very important to note that the drill 12, and therefore the user (i.e., operator) are disposed off to the side away from the gravity centerline 24a.

This position, during cutting of the limb 24, ensures that after the limb 24 is severed and begins to fall downward along the gravity centerline 24a that it will not impact the user. If the angle 25 were 90 degrees and the saw blade 22 was disposed in the desired vertical position, the user would be disposed directly under the limb 24 along the gravity centerline 24a. Accordingly, the angle 25 is less than 90 degrees.

Conversely, if the angle 25 were considerably less than 45 degrees, the user would be disposed too far from the gravity centerline 24a. This would cause more of the weight of the housing 20 and of the upper portion of the reciprocating pruning saw 10 to be experienced a distance away from the user. The user would feel torque and would struggle to support the extended housing 20 if the angle was less than 45 degrees. In general, 70 degrees is preferred.

This, in turn, would make control of the placement of the saw blade 22 more difficult to accomplish. It is easier to support, move, and place the reciprocating pruning saw 10 precisely where desired on the limb 24 when it is held in a more nearly vertical position. Accordingly, the angle 25 being greater than 45 degrees and less than 90 degrees is important to the safe and comfortable operation of the reciprocating pruning saw.

It is also important to note that the limb 24 is disposed overhead. The height of the limb 24 is a variable. It is desirable to be able to vary the height of the saw blade 22 with respect to the ground surface while maintaining the drill 12 at or near the same comfortable elevation above the ground surface. If this were not the case, the user would have to position himself or herself further away from the gravity centerline 24a for lower limbs 24 and closer to the gravity centerline 24a for higher limbs 24. For the reasons as discussed herein, neither of these positions is preferable.

To accomplish the necessary range of motion the driven shaft 16b telescopes (i.e., extends or retracts) over the drive shaft 16. The outer sleeve 18 also similarly telescopes and is used to secure the reciprocating pruning saw 10 in a desired position of extension. This is described in greater detail hereinafter.

Referring now in particular to FIG. 2 and FIG. 3, the drive shaft 16 includes three flat surfaces 17 that are provided about one-half of an inch back from a second end 16d of the drive shaft 16. Each of the flat surfaces 17 extends longitudinally for about an inch. Three round pins 26 that are provided that are slightly shorter than each of the flat surfaces 17. One each of the pins 26 is disposed on each of the three flat surfaces 17 in alignment with the second center longitudinal axis 16c of the drive shaft 16.

Each of the pins 26 is retained on its respective flat surface 17. It cannot move longitudinally because it is retained at the second end 16d by a first wall 16e and at an opposite end of the pin 26 by an opposite second wall 16f.

During use of the reciprocating pruning saw 10, the second end 16d is always disposed inside of the driven shaft 16b an amount sufficient for a lower end 16g of the driven shaft 16b to cover the flat surfaces 17. The outside diameter of the drive shaft 16 is only slightly less than the inside diameter of the driven shaft 16b. Therefore, the inside surface of the driven shaft 16b retains each of the pins 26 radially with respect to the drive shaft 16.

When the three flat surfaces 17 are viewed in cross-section a generally triangular shape is observed with ends that include the radius of the driven shaft 16*b*. The outside diameter of the drive shaft 16 is only slightly less than the inside diameter of the driven shaft 16*b*.

When the drive shaft 16 rotates with respect to the driven shaft 16*b*, the pins 26 all roll in the same direction on the flat surfaces 17 (i.e., they momentarily lag behind the rotary motion of the drive shaft 16 due to inertia). The drill 12 supplies the motive power to rotate the drive shaft 16. This is described in greater detail hereinafter.

The pins 26 have an outside diameter that, when disposed in the center of each of the flat surfaces 17, protrude slightly above the outside diameter of the drive shaft 16 but do not make contact (i.e., touch) the inside surface of the driven shaft 16*b*. A small gap exists between the inside surface of the driven shaft 16*b* and the pins 26 when the pins are disposed in the center of the flat surfaces 17. As the pins 26 roll toward the same side of each of the flat surfaces 17 in unison two things happen. First, as the pins 26 roll the diameter of each of the pins 26 on the flat surfaces 17 continues to protrude even further beyond (i.e., higher than) the outside diameter of the drive shaft 16. Accordingly, they begin to bear upon (i.e., make contact with) the inside surface of the driven shaft 16*b*. This causes increasing friction between the pins 26 and the inside of the driven shaft 16*b* which further urges the pins 26 to continue their motion in the same direction. This action causes each of the pins 26 to bind, or wedge, in position between the flat surface 17 and the driven shaft 16*b*. This effectively locks the drive shaft 16 to the driven shaft 16*b*. In actual use only a fraction of a revolution (typically about one-eight of a turn) is all that is required to fully engage (i.e., lock) the drive shaft 16 and the driven shaft 16*b* together.

Second, as the pins 26 roll, the drive shaft 16 remains centered concentrically with respect to the driven shaft 16*b*. If less than three of the flat surfaces 17 are used, the drive shaft 16 may not remain centered. It is possible to further modify the design and use more than three flat surfaces 17, if desired. It is possible to also use fewer than three flat surfaces 17 when a greater tolerance in concentricity between the drive shaft 16 and the driven shaft 16*b* is acceptable, for example, with a lower cost version of the reciprocating pruning saw 10. Ideally, the drive shaft 16 and the driven shaft 16*b* should remain centered in the outer sleeve 18 and concentric with respect to the outer sleeve 18 for minimum vibration. A surprising and unexpected benefit of this design is that it is inexpensive to manufacture. With the solid drive shaft 16, only the three flat surfaces 17 near the second end 16*d* need be provided. No other modification to the driven shaft 16*b* is required for power transfer to occur. It is also exceptionally easy to assemble during manufacture. The three pins 26 need only be placed on the flat surfaces 17 and momentarily held there until the second end 16*d* can be inserted into the lower end 16*g* of the driven shaft 16*b*.

Another surprising and unexpected benefit that is provided by the drive mechanism is easy changing (i.e., extension or retraction) of the overall combined length of the drive shaft 16 and the driven shaft 16*b* while maintaining efficacy of the drive mechanism throughout the range of motion. To shorten the overall length a center collet 30 (FIG. 8) is loosened and an upper outer sleeve 18*a* is urged into a lower outer sleeve 18*b*. The center collet 30 is then tightened to secure the upper outer sleeve 18*a* in position relative to the lower outer sleeve 18*b*.

To increase the overall length the procedure is reversed. This type of motion is also sometimes referred to as a "telescoping" action. Together, the upper outer sleeve 18*a* and the lower outer sleeve 18*b* form the overall outer sleeve 18 that protects the user from contact with any moving part of the drill 12 or the reciprocating pruning saw that is located intermediate the drill 12 and the saw blade 22.

When the overall length is shortened, the drive shaft 16 slides inside of the driven shaft 16*b* an amount that is equal to that which the upper outer sleeve 18 was urged further into the lower outer sleeve 18*b*. When the overall length is increased, the drive shaft 16 slides further out of the driven shaft 16*b* an amount that is equal to that which the upper outer sleeve 18 was urged further out of the lower outer sleeve 18*b*. This motion is illustrated by arrow 32 (FIG. 3). However, the drive shaft 16 is never urged out of the driven shaft 16*b* an amount that will dispose the flat surfaces 17 and pins 26 beyond the lower end 16*g* of the driven shaft 16*b*, where they could fall away from the drive shaft 16.

The drive mechanism allows for easy extension and retraction, as previously described. The pins 26, when urged longitudinally inside of the driven shaft 16*b*, do not increase resistance noticeably. Accordingly, the drive mechanism can easily be extended or retracted (i.e., telescoped). It is also important to note that the drive mechanism is instantly ready to function (i.e., to transfer rotary motion of the drive shaft 16 to the driven shaft 16*b*) at any position of the drive shaft 16 with respect to the driven shaft 16*b*.

A further unexpected benefit is also provided by the instant drive mechanism. Power is transferred equally well regardless of the direction of rotation of the drive shaft 16. The only difference is that the pins 26 will roll in opposite directions along the flat surfaces 17, depending on the direction of rotation of the drive shaft 16. Accordingly, if the drill 12 is in reverse or forward, the reciprocating pruning saw 10 will work equally well when cutting the limb 24. The user may not even realize that the drill 12 was in reverse while cutting the limb 24.

Figure 4:
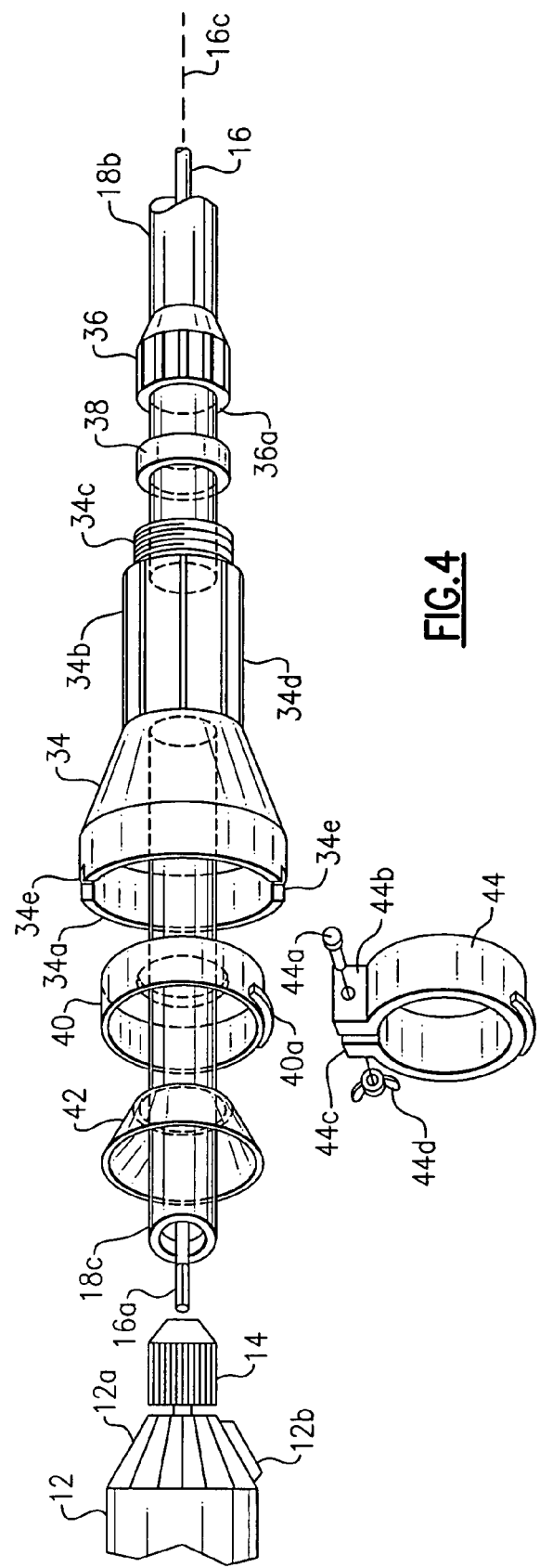
FIG. 4 is an exploded view in perspective of a lower portion of the reciprocating pruning saw as it is attached to a drill.

Referring now also in particular to FIG. 4, attachment of a lower end 18*c* of the lower outer sleeve 18*b* to the drill 12, is shown. A shroud 34 includes a generally conical or bell-shaped first end 34*a* and an opposite second end 34*b* that includes outside shroud threads 34*c*. A barrel 34*d* is intermediate the first end 34*a* and the second end 34*b* and it includes an inside diameter that is slightly more than an outside diameter of the lower outer sleeve 18*b*. Accordingly, the shroud 34 is able to slide longitudinally over the lower outer sleeve 18*b*. A pair of recesses 34*e* that are oppositely disposed with respect to each other are provided in the larger end of the bell-shaped first end 34*a*.

A lower collet 36 is first urged over the lower end 18*c* of the lower outer sleeve 18*b*. A rubber ring 38 is then urged over the lower outer sleeve 18*b*. The shroud 34 is then urged over the lower outer sleeve 18*b*, as shown. The inside of the lower collet 36 includes inside lower collet threads 36*a* that cooperate with the outside shroud threads 34*c* and a taper that is adapted to bear on the rubber ring 38.

When the lower collet 36 is tightened to the shroud 34, the taper binds the rubber ring 38, thereby increasingly constricting and urging it tightly against the lower outer sleeve 18*b*. This secures the shroud 34 to the lower outer sleeve 18*b* so that the shroud 34 cannot rotate or move longitudinally with respect to the lower outer sleeve 18*b*. Similarly, the lower outer sleeve 18*b* cannot move relative to the shroud 34, once the lower collet 36 is tightened.

As is described in detail hereinafter, the shroud 34 is also secured to the drill 12. Once this is also accomplished, the lower outer sleeve 18*b* is secured relative to the drill 12. And as is also described in greater detail hereinafter, the remainder of the reciprocating pruning saw 10 prior to use is secured relative to the lower outer sleeve 18b. Therefore, the entire reciprocating pruning saw 10 is secured to the drill 12 prior to any use thereof.

An adapter plate 40 that is open at a first drill end and which includes a smaller opening that is larger than the outside diameter of the lower outer sleeve 18b is provided. The inside of the adapter plate 40 includes a conical taper from the first drill end to the smaller opening. The adapter plate 40 is then placed over the lower outer sleeve 18b and urged toward the lower end 18c of the lower outer sleeve 18b, as shown.

The adapter plate 40 is used to adapt the shroud 34 for use with intended types and models of the drill 12. Different sizes and types of the adapted plate 40 can be provided that include different inside (and outside) diameters and different inner tapers to accommodate different nose profiles 12a of the drill 12. A rubber cone 42 is then inserted into the adapter plate 40, as shown. If preferred, a variety of modified rubber cones 42 are provided that each include a different taper and/or profile to accommodate different nose profiles 12a of different types and models of drills 12. This approach can reduce the need for numerous different adapter plates 40.

The adapter plate 40 includes at least one protrusion 40a that enters into at least one of the pair of recesses 34e of the shroud 34. This engagement locks the adapter plate 40 to the shroud 34 so that they cannot rotate with respect to each other about the second center longitudinal axis 16c of the drive shaft 16.

If desired, the adapter plate 40 and the shroud 34 can be modified to include other methods of similarly securing these two components together to prevent rotation about the second center longitudinal axis 16c with respect to each other. For example, fewer or more than the pair of recesses 34e can be included, as desired.

To secure the reciprocating pruning saw 10 to the drill 12, the drill chuck 14 is opened and the first end 16a of the drive shaft 16 is inserted therein with the rubber cone 42, adapter plate 40, shroud 34, rubber ring 38, and lower collet 36 disposed up along the lower outer sleeve 18b, as shown in FIG. 4. The drill chuck 14 is then tightened to secure the first end 16a of the drive shaft 16 thereto.

As is described in greater detail, the drive shaft 16 is secured to the lower outer sleeve 18b in such manner that it can rotate about the second center longitudinal axis 16c with respect to the lower outer sleeve 18b, but cannot move longitudinally with respect thereto. Accordingly, the lower outer sleeve 18b is longitudinally secured to the drill 12 whenever the drill chuck 14 is tightened to the first end 16a of the drive shaft 16.

The user then grasps the shroud 34 and urges the shroud 34, adapter plate 40, and rubber cone 42 longitudinally over the lower outer sleeve 18b until the rubber cone 42 is in tight contact with the nose profile 12a of the drill 12. The lower collet 36 is then similarly urged to the shroud 34 along with the rubber ring 38 while maintaining pressure to keep the shroud 34, adapter plate 40, and rubber cone 42 in tight contact with the drill 12. The lower collet 36 is then tightened to the shroud 34 by rotating it and the use of the outside shroud threads 34c and inside lower collet threads 36a.

This further secures the lower outer sleeve 18b to the drill 12 sufficient to prevent rotation of the lower outer sleeve 18b about the second center longitudinal axis 16c with respect to the drill 12. This also prevents similar rotary movement of the remainder of the reciprocating pruning saw 10 relative to the drill 12 during use.

A modified adapter plate 44 is shown below the adapter plate 40 and is used for certain types of drills that include a flat, rather than a tapered, nose profile 12a. The modified adapter plate 44 includes an open ended ring with a bolt 44a passing through a pair of lugs 44b, 44c that are attached to each end of the ring. A wing nut 44d is tightened to pinch the modified adapter plate 44 to the drill 12 having a flat nose profile 12a. The rubber cone 42 is not used when the modified adapter plate 44 is used.

The modified adapter plate 44 is made large enough to fit the vast majority of drills 12 that have a flat nose profile 12a. If desired, flat rubber rings (not shown) are included and are inserted in the modified adapter plate 44 to reduce its inside diameter to accommodate smaller diameter flat nose profile 12a types of drills 12.

Certain types of drills 12 have a series of raised longitudinal ridges 12b and alternating indentations along the nose profile 12a and which extend toward the drill chuck 14. It is similarly possible to modify the adapter plate 40 and provide a second modified adapter plate that includes corresponding longitudinal raised ridges that can engage with the alternating ridges 12b and indentations of this type of drill 12 thereby again preventing rotation about the second center longitudinal axis 16c. If the second modified adapter plate is used, the rubber cone 42 is not used.

Figure 7:
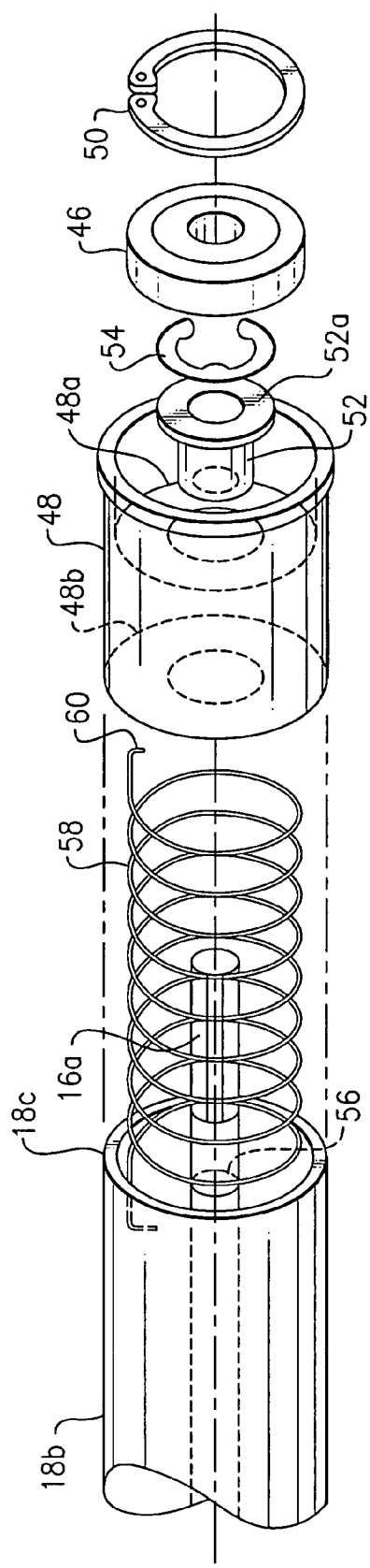
FIG. 7 is an exploded view in perspective of a bearing attachment of a lower (drill) end of a drive shaft of the reciprocating pruning saw to a lower outer sleeve.

Referring now also in particular to FIG. 5 and FIG. 7, is shown a lower bearing 46 that is secured to a spring retainer bushing 48 by a clip ring 50 that secures to an inside groove 48a provided in the spring retainer bushing 48.

Intermediate the spring retainer bearing 48 and the lower bearing 46 is an oil impregnated flange bushing 52 that enters into a cylindrical opening in the spring retainer bushing 48 up to a flange 52a of the flange bushing 52. An E-clip 54 seats into a groove 56 that is provided in the drive shaft 16 and which secures the spring retainer bushing 48, flange bushing 52, and lower bearing 46 to the drive shaft 16.

The E-clip 54, spring retainer bushing 48, flange bushing 52, and bearing 46 together comprise a preferred bearing support that is used in two locations (FIG. 5) to support the drive shaft 16.

The spring retainer bushing 48 is press-fit into the lower end 18c of the lower outer sleeve 18b, and therefore it also secures the drive shaft 16 longitudinally with respect to the lower outer sleeve 18b. The lower outer sleeve 18b also includes a dimple ring 53 that is pressed into the lower outer sleeve 18b from the outside after the spring retainer bushing 48 is press-fit into the lower end 18c. The dimple ring 53 bears down on the spring retainer bushing 48 and further helps to secure it in position to the lower outer sleeve 18b.

A bushing spring 58 includes a hooked first end 60 that seats into a recess 48b provided in the spring retainer bushing 48. When the spring retainer bushing 48 is press-fit into the lower end 18c of the lower outer sleeve 18b, the hooked first end 60 is retained in position. The drive shaft 16 passes through the lower bearing 46, flange bushing 52, and spring retainer bushing 48. Therefore, the lower bearing 46 and flange bushing 52 provide support for the lower end of the drive shaft 16 to rotate.

Referring again momentarily to FIG. 5, an extensible bushing 62 is disposed in the lower outer sleeve 18b. A hooked second end 64 of the bushing spring 58 is attached to the extensible bushing 62 in a manner similar to that which the hooked first end 60 is attached to the spring retainer bushing 48. The extensible bushing 62 is adapted to slide longitudinally within the lower outer sleeve 18b and over the drive shaft 16 with its range of motion limited by the bushing spring 58.

FIG. 5 shows a lower portion of the reciprocating pruning saw 10 when the saw 10 is disposed in a fully retracted position. A lower end 18d of the upper outer sleeve 18a includes a bearing bushing 66 that is press-fit into the lower end 18d of the upper outer sleeve 18a. A second dimple 68 is pressed into the upper outer sleeve 18a to secure the bearing bushing 66 to the upper outer sleeve 18a.

A second E-clip 70 fits into a second groove provided in the driven shaft 16b. An intermediate bearing 72 is disposed in a recess provided in the bearing bushing 66. A second clip ring 74 fits into a groove provided in the recess of the bearing bushing 66 and secures the intermediate bearing 72 thereto and therefore also to the upper outer sleeve 18a and to the driven shaft 16b. The intermediate bearing 72 provides support for driven shaft 16b to allow it to rotate. The extensible bushing 62 provides support for the drive shaft 16. Accordingly, as the upper outer sleeve 18a is retracted longitudinally further down into the lower outer sleeve 18b or is extended further out of the lower outer sleeve 18b, the bearing bushing 66 and the driven shaft 16b are similarly urged along the lower outer sleeve 18b.

When the reciprocating pruning saw 10 is disposed in the fully retracted position, as shown in FIG. 5, the bearing bushing 66 makes contact with a side of the extensible bushing 62 that is opposite to where the bushing spring 58 is disposed. As the upper outer sleeve 18a is urged further down into the lower outer sleeve 18b, the extensible bushing 62 is urged within the lower outer sleeve 18b closer toward the drill 12, thereby compressing the bushing spring 58 until it is maximally compressed as shown in FIG. 5.

Figure 8:
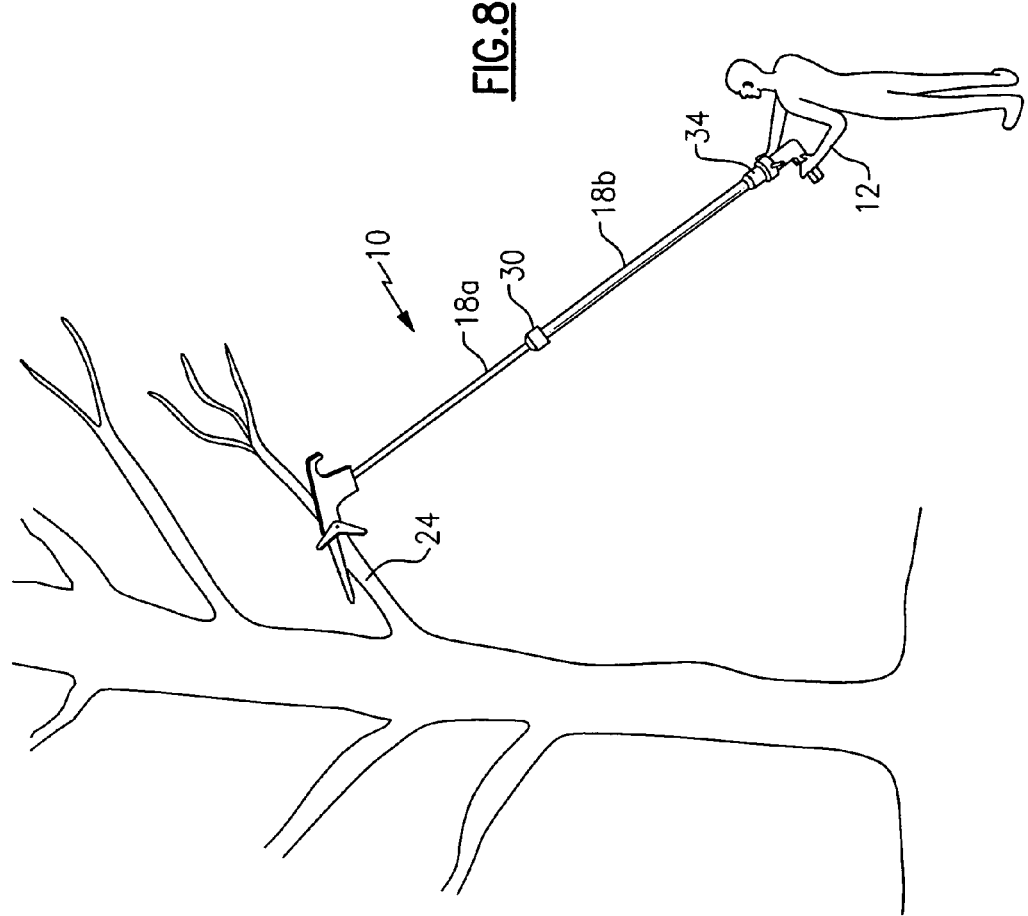
FIG. 8 is a view in perspective of the reciprocating pruning saw being used to limb a branch at maximum extension.

Referring also to FIG. 6, the reciprocating pruning saw 10 is disposed in a maximally extended (i.e., telescoped) position, as also shown in FIG. 8. In this position the bushing spring 58 is maximally extended and has urged the extensible bushing 62 as far away from the drill 12 as possible. It is important to note that the upper end of the drive shaft 16 is always disposed inside of the driven shaft 16b. Therefore the upper end of the drive shaft 16 is supported by its drive engagement (see FIG. 3) with the driven shaft 16b.

It is desirable to provide an intermediate bushing that retains the drive shaft 16 concentrically within the lower outer sleeve 18b, especially when it is under torque as when actually cutting the limb 24. Under torque, the drive shaft 16 will have a tendency to warp. The extensible bushing 62 functions as the intermediate bushing which, in turn, retains the drive shaft 16 concentrically within the lower outer sleeve 18b. This support is needed most when the reciprocating pruning saw 10 is in the extended position.

It is also preferable to include one or more fixed intermediate bushings 62a (FIG. 6) in the upper outer sleeve 18a to provide support for the driven shaft 16b along its longitudinal length. The fixed intermediate bushings 62a are dimpled in place and do not change their position relative to the upper outer sleeve 18a during retraction or extension of the reciprocating pruning saw 10.

It is important to note that the extensible bushing 62 provides intermediate support to retain the drive shaft 16 in the lower outer sleeve 18b when the reciprocating pruning saw 10 is maximally extended and that it provides support closer to the drill 12, as needed, when the reciprocating pruning saw 10 is progressively retracted.

To secure the upper outer sleeve 18a relative to the lower outer sleeve 18b longitudinally, the center collet 30 is loosened from its threaded engagement with a threaded upper member 76. The threaded upper member 76 is attached to an upper end of the lower outer sleeve 18b. A second rubber ring (not shown) that is similar to the rubber ring 38 but smaller in inside diameter than the rubber ring 38 in order to fit over the upper outer sleeve 18a is disposed inside the center collet 30 and between the upper member 76. When the center collet 30 is tightened the second rubber ring bears on both the upper member 76 and the upper outer sleeve 18a sufficient to secure the upper outer sleeve 18a relative to the lower outer sleeve 18b.

Accordingly, the upper outer sleeve 18a cannot extend or retract longitudinally with respect to the lower outer sleeve 18b when the center collet 30 is tightened. Similarly, the upper outer sleeve 18a cannot rotate with respect to the lower outer sleeve 18b when the center collet 30 is tightened. Because the lower outer sleeve 18b is secured to the drill 12, as previously described, the upper outer sleeve 18a is accordingly also secured relative to the drill 12.

Figure 12:
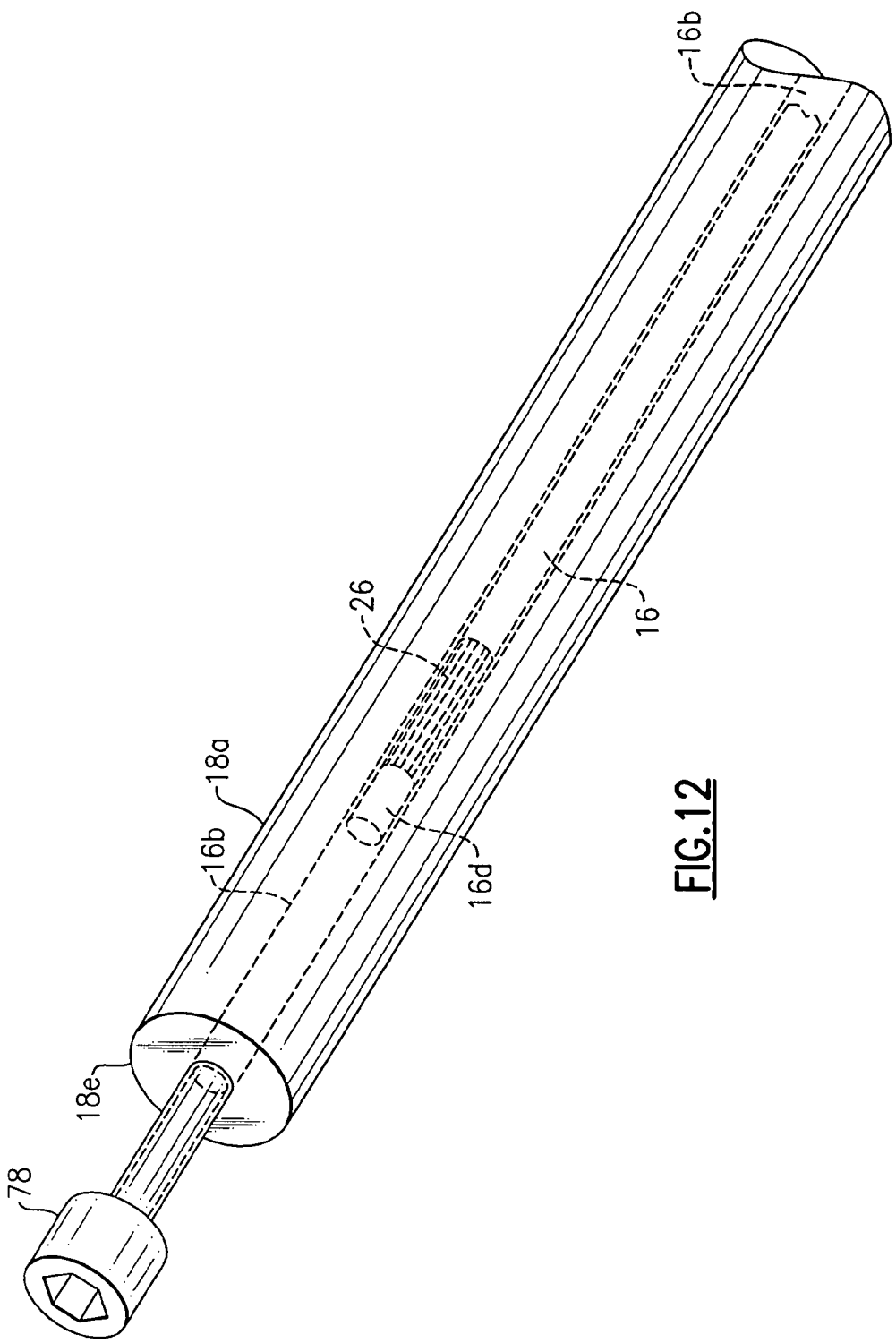
FIG. 12 is a view in perspective of an upper end of a driven shaft and upper end of a drive shaft that is disposed in an upper outer sleeve.

Referring momentarily to FIG. 12, a detail of an upper end of the upper outer sleeve 18a is shown when the reciprocating pruning saw 10 is in a fully retracted position. The second end 16d of the drive shaft 16 is disposed maximally close to an upper open end 18e of the upper outer sleeve 18a in the retracted position. An upper end of the driven shaft 16b includes a hex drive socket 78. It is used to supply rotary motion to the housing 20, as is described in greater detail hereinafter.

Figure 11:
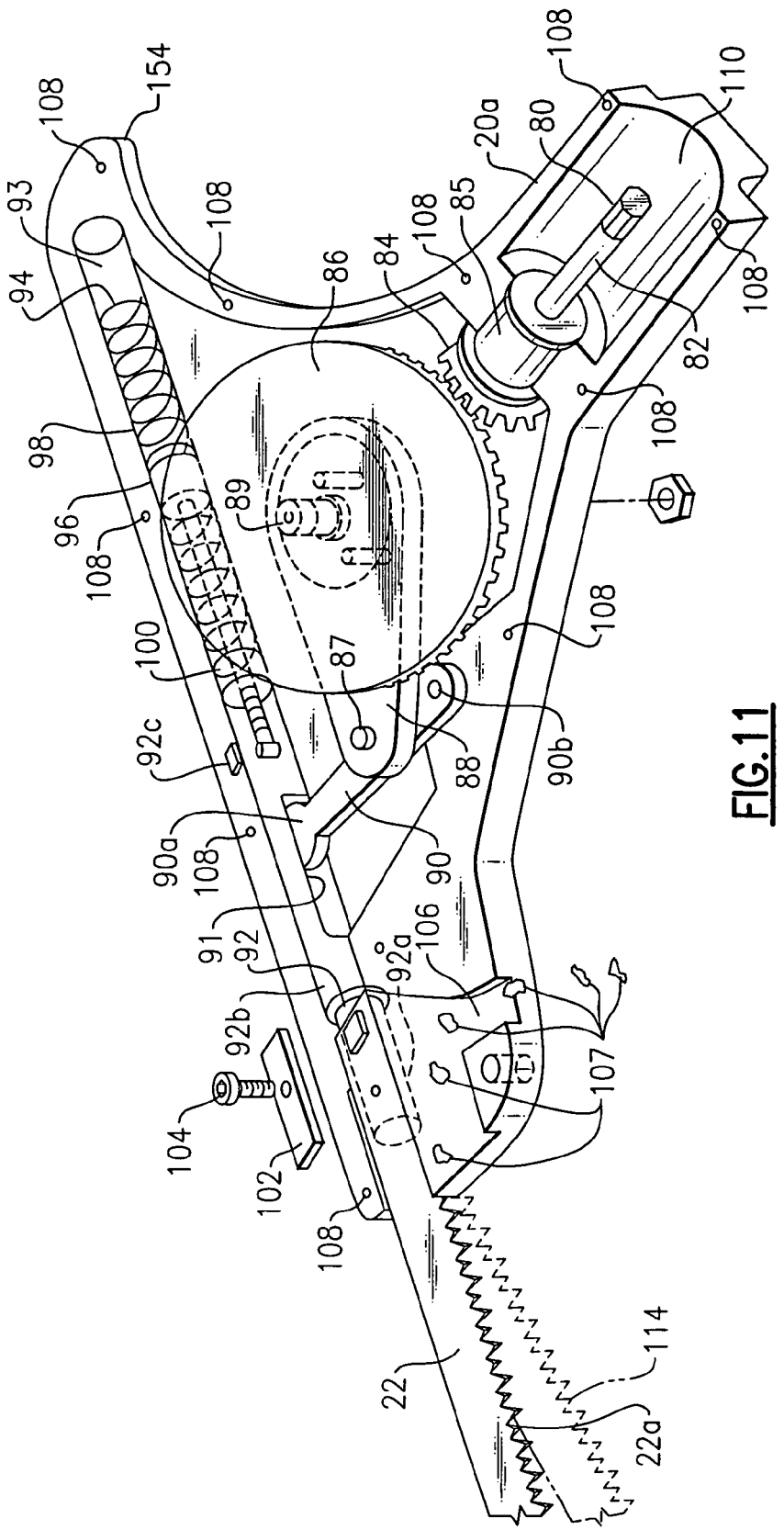
FIG. 11 is a partially exploded view in perspective of a lower half of a housing of the reciprocating pruning saw with an upper half removed therefrom.

Referring now to FIG. 11, a lower half 20a of the housing 20 is shown. The upper half is similar to the lower half 20a but modified to provide clearance for the component parts, as necessary. The hex drive socket 78 (not shown in this view) slips over a hex nut 80 of a drive-gear shaft 82. The drive-gear shaft 82 is connected to a bevel drive gear 84 which, in turn, drives a main gear 86. A flange thrust bearing 85 is secured to the housing 20 and it provides support for the drive-gear shaft 82 sufficient to resist forces transferred to the drive-gear shaft 82 by the bevel drive gear 84.

An eccentric 88 member is pivotally attached about a crank 89 that is also attached to the main gear 86. As the crank 89 rotates it provides oscillation to the eccentric 88 member. The crank 89 is preferred because it passes through the housing 20 and provides increased structural integrity and therefore durability to the reciprocating pruning saw 10.

Other ways of providing an eccentric are also known. For example, if desired, an offset pin (not shown) could be attached to the main gear 86 and the eccentric 88 member could be pivotally attached to the offset pin. An opposite end of the eccentric 88 is pivotally attached about a pivot pin 87 and drives an oscillating member 90 back and forth as the main gear 86 rotates in either direction. The oscillating member 90 may also be referred to as a "rocker" as it rocks back and forth.

The oscillating member 90 includes a rounded top portion 90a that fits into a piston recess 91 provided in a piston 92 and is adapted to pivot about a pivot pin 90b at a bottom thereof. The piston 92 is disposed in a cylindrical channel 93 that extends across an upper portion of the housing 20. One-half of the channel is disposed on the lower half 20a and a remaining upper half of the channel is provided on the upper half of the housing 20.

As the main gear 86 rotates, the piston 92 is urged back and forth within the channel 93. The length of stroke of the piston 92 (and therefore of the saw blade 22) is controlled by varying, as preferred, the amount of offset of the crank 89 (or location of the offset pin on the main gear 86) or the position of the pivot pin 87 on the oscillating member 90. It is also preferred to include a sleeve 92b over the piston 92. In the drawing, the sleeve 92b is shown as surrounding the piston 92. The sleeve 92b reduces friction of the piston 92 in the housing 20. The sleeve 92b includes a tab 92c that anchors it to the housing 20.

An elongated bolt 94 is attached by threads to a rear of the piston 92. A center ring 96 is fixedly attached to the sleeve.

Alternately, it could be attached to the housing 20. The shaft of the elongated bolt 94 passes through the center ring 96. A first anti-vibration spring 98 is disposed on one side of the center ring 96 and a second anti-vibration spring 100 is disposed on an opposite side of the center ring 96.

Accordingly, when the piston 92 retracts further into the housing 20, the piston 92 compresses the second anti-vibration spring 100 into the center ring 96 and relaxes tension on the first anti-vibration spring 98 as the bolt head moves in the same direction (i.e., to the right) as the piston 92 is moving. When the piston 92 extends further away from the housing 20 (i.e., to the left), a head of the elongated bolt 94 compresses the first anti-vibration spring 98 as the piston 92 moving to the left also relaxes tension on the second anti-vibration spring 100. The elongated bolt 94 is tightened or loosened to the piston 92 to provide optimum pre-tensioning. This arrangement decreases the level of vibration that is experienced and helps to keep the saw blade 22 in position on the limb 24 during use.

The saw blade 22 is secured to a flat end 92a of the piston 92 by a mounting plate 102 and mounting screw 104. An opening is provided in the upper half of the housing 20 to allow access to the mounting plate 102 and the mounting screw 104.

A channel 106 is provided in the lower half 20a of the housing 20 to allow saw dust 107 from the limb 24 to pass through the channel 106 and fall to the ground rather than collect in the housing 20 where it might possibly cause a binding of the saw blade 22 or the piston 92.

After the hex drive socket 78 is urged over the hex nut 80, the upper half of the housing is placed directly on top of the lower half 20a of the housing 20 and is secured thereto by mounting screws (not shown) that thread into mounting holes 108 that are provided in the lower half 20a of the housing 20.

The upper open end 18e of the upper outer sleeve 18a is disposed in a cylindrical recess 110 provided in a lower part of the housing 20. As the mounting screws are tightened and the upper half of the housing urged toward the lower half 20a, the upper open end 18e of the upper outer sleeve 18a is pinched in the cylindrical recess 110. This tightly secures the housing 20 to the upper open end 18e and therefore, also secures the hex drive socket 78 to the hex nut 80. It is also preferable to include a second tab (not shown) on the upper open end 18e of the upper outer sleeve 18a that fits into a corresponding recess provided in the housing 20 to better secure the upper outer sleeve 18a thereto.

When the drill 12 is energized, the drill chuck 14 rotates in either direction (depending whether the drill 12 is in forward or reverse) and the drive shaft 16 is rotated by the drill chuck 14. This causes the pins 26 to engage, as previously described, the inside surface of the driven shaft 16b regardless of the degree of extension or retraction that is set. As the driven shaft 16b rotates, rotary motion is transferred to the hex nut 80, the drive-gear shaft 82, and the bevel drive gear 84 which, in turn, drives the main gear 86. The eccentric 88 drives the oscillating member 90 which causes the piston 92 to oscillate back and forth in the channel 93 with one cycle of the piston 92 occurring for each revolution of the main gear 86. As the piston 92 is connected to the saw blade 22 it too oscillates back and forth in cyclic unison with the piston 92.

To increase the speed of the drill 12 will correspondingly increase the speed (i.e., the number of strokes per minute) that is experienced by the saw blade 22.

The saw blade 22, as shown, includes teeth 22b that are disposed on a longitudinal line that is generally parallel with that of a longitudinal axis of the piston 92. This, thereby, produces a direct back and forth linear motion of the saw blade 22.

A type of saw blade, well known, that cuts in both directions of the stroke is preferably used when the longitudinal line of the teeth 22b are parallel with the longitudinal axis of the piston 92. With this type of saw blade 22, a reactive force relative to the limb 24 attempts to draw the housing 20 toward the limb 24 for one-half of the cycle of the saw blade 22 (i.e., during retraction of the saw blade 22) and it attempts to push the housing 20 away from the limb during the remaining half of the cycle of the saw blade 22 (i.e., during extension of the saw blade 22).

Figure 9:
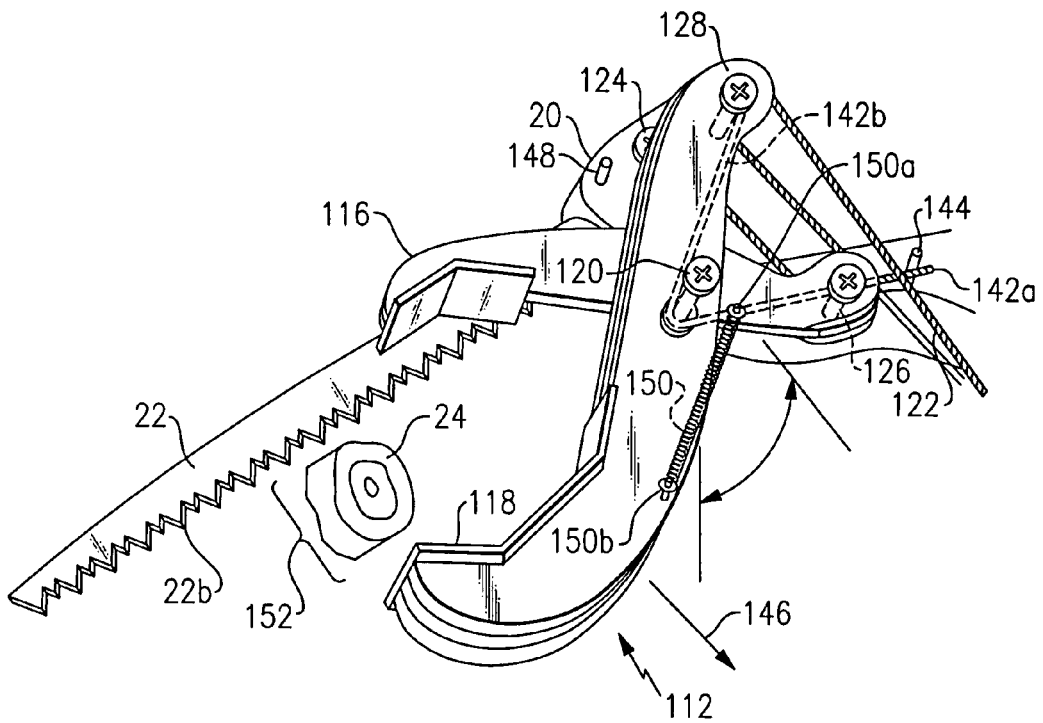
FIG. 9 is a view in perspective of an optional clamping mechanism of the reciprocating pruning saw in an open position.

To prevent the housing 20 from moving with this type of the saw blade, an optional clamping mechanism, identified in general by the reference numeral 112 as shown in FIG. 9, is preferably used. The clamping mechanism 112 is described in greater detail hereinafter.

Another common type of the saw blade 22 also for use with the reciprocating pruning saw 10 includes teeth 22b that are disposed on a longitudinal line that is generally disposed at a downward angle, as shown by dashed line 114 with respect to the longitudinal axis of the piston 92. This type of the saw blade 22 cuts only on the retraction half of the stroke of the piston 92.

Therefore, the downward sloped type of the saw blade 22 is always tending to draw the housing 20 toward the limb 24. Accordingly, the clamping mechanism 112 is not needed to help maintain the housing 20 proximate the limb 24. However, if desired, the clamping mechanism 112 can still be used to better control placement of the severed limbs, as is described in greater detail hereinafter.

Figure 10:
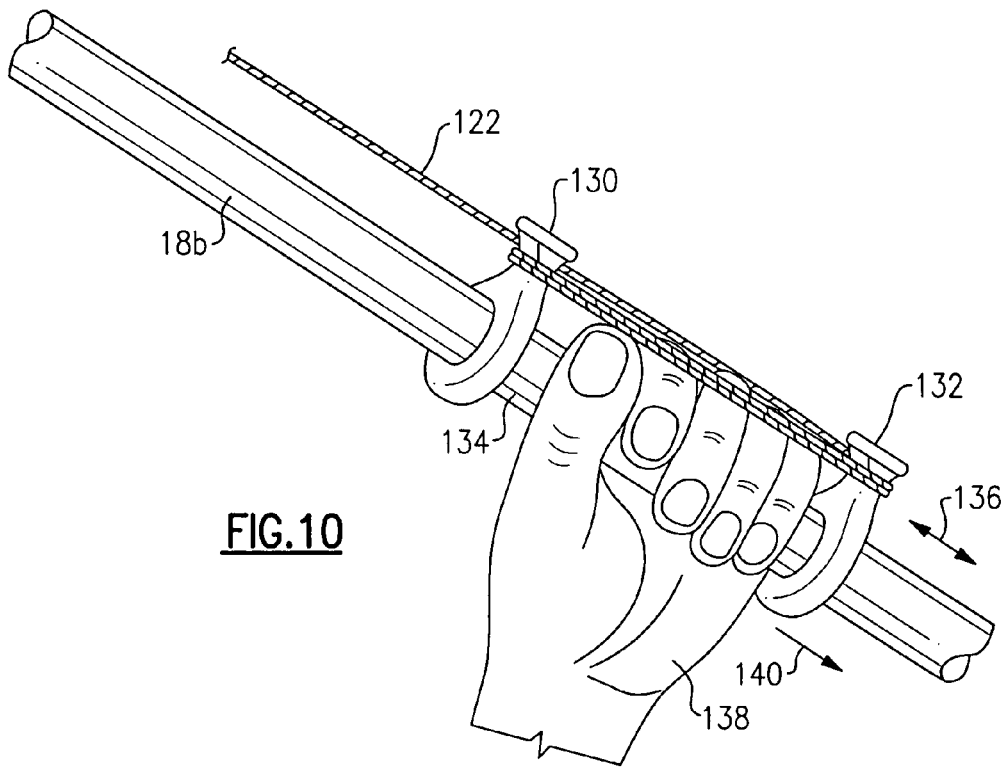
FIG. 10 is a view in perspective of a sliding handle disposed over a lower outer sleeve (housing) of the reciprocating pruning saw.

Referring now also to FIG. 9 and on occasion to FIG. 10, is shown the optional clamping mechanism 112 attached to side of the housing 20 and facing the saw blade 22. An upper jaw 116 and a lower jaw 118 are adapted to pivot about a center pivot screw 120 with respect to each other and the housing 20.

A cord 122 passes through a handle portion of the lower jaw 118 where it terminates in a knot 124. The cord 122 loops around a first pulley 126 disposed at an end of a handle of the upper jaw 116, continues upward and around a second pulley 128 disposed at an end of the handle of the lower jaw 118.

Referring momentarily now to FIG. 10, the cord 122 then continues down in a direction generally toward the drill 12 where it is looped around a pair of spaced apart protrusions 130, 132 that are attached to opposite longitudinal ends of a sliding handle 134.

The sliding handle 134 includes a cylindrical center opening there-through that includes an inside diameter that is slightly greater than an outside diameter of the lower outer sleeve 18b. Accordingly, the sliding handle 134 is able to slide over the lower outer sleeve 18b along its longitudinal length in either direction as shown by arrow 136. During use, it is grasped by a hand 138. The hand 138 generally applies a force in the direction of arrow 140 during an actual cutting of the limb 24.

Referring back to FIG. 9, a first end 142a of a V-shaped spring 142 is retained by anchor pin 144 that is attached to the upper half of the housing 20. An opposite second end 142b of the V-shaped spring 142 is attached to the end of the handle of the lower jaw 118 at the second pulley 128. Accordingly, the V-shaped spring 142 applies a force to the lower jaw 118 relative to the housing 20 that urges the lower jaw 118 in a downward direction, as shown by arrow 146. The range of downward motion by the lower jaw 118 is limited by when the handle of the lower jaw 118 makes contact with a second anchor pin 148. The second anchor pin 148 is attached to the housing 20.

A coil spring 150 is attached at a first end 150a to the lower jaw 118 and at an opposite second end 150b to the handle of the upper jaw 116. The coil spring 150 supplies a force that tends to urge the upper jaw 116 to open with respect to the lower jaw 118. The second anchor pin 148 also limits the upward range of motion possible for the upper jaw 116. If desired, an additional anchor pin (not shown) can be added and used to limit the upward motion by the upper jaw 116 that is disposed near to the second anchor pin 148.

Accordingly, when the clamping mechanism 112 is in a quiescent state, that is to say when the user is not applying a force in the direction of arrow 140 (FIG. 10), the upper jaw 116 is disposed above the teeth 22b of the saw blade 22 and therefore will not interfere with the limb 24 when the saw blade 22 is drawn toward the limb 24. Similarly, lower jaw 118 is maximally disposed below the saw blade 22. This provides a maximum approach area, as shown by bracket 152 to urge the housing 20 toward the limb 24 so as to cause the limb 24 to be disposed between the upper jaw 116 and the lower jaw 118 prior to a cutting thereof.

During a cutting of the limb 24, when the optional clamping mechanism 112 is included, the user begins to apply a force to the sliding handle 134 in the direction of arrow 140. This begins to draw the lower jaw 118 in an upward direction, the opposite that as shown by arrow 146. This tends to supply a force that attempts to urge the limb 24 up toward the saw blade 22 and the saw blade 22 down toward the limb 24. This force speeds up the actual cutting through the limb 24. It also secures the limb 24 in position relative to the housing 20 during its cutting. This, in turn, prevents the housing from moving alternately toward the limb 24 and away from the limb 24 in response to the reactive forces that are generated by a dual-cutting (i.e., that cuts in both directions) type of the saw blade 22.

An unexpected benefit is provided by the clamping mechanism 112 when the reciprocating pruning saw 10 is oriented so that the portion of the limb 24 that is being severed (i.e., removed from the tree) is disposed on the same side of the housing 20 as is the clamping mechanism 112. As the limb 24 is being severed the user continues to maintain force on the sliding handle 134. Once the limb 24 is severed, the upper jaw 116 and the lower jaw 118 retain the severed portion of the limb 24 therein.

This is especially useful when the limb 24 is disposed over an automobile, structure, or other object that could be damaged by the limb 24 falling on it. The user maintains pressure on the sliding handle 134 in the direction of arrow 140 while urging the housing 20 and the severed portion of the limb 24 that is now secured thereto away from where it was severed.

When the severed portion of the limb 24 is disposed over a safe release area, pressure on the sliding handle 134 is released and it is urged in an opposite direction to that shown by arrow 140. This causes the lower jaw 118 and the upper jaw 116 to separate with respect to each other thereby releasing the severed portion of the limb 24 where it can fall safely to the ground. Accordingly, the reciprocating pruning saw 10 provides for the safe cutting of the limb 24.

Referring again momentarily to FIG. 1, another possible method of securing the reciprocating pruning saw 10 to the drill is shown. A possible further modified adapter plate 41 includes a hole that is provided therein through which the handle 13 of the drill 12 is inserted. This illustrates how, after having had benefit of the instant disclosure, numerous other possible modifications to the reciprocating pruning saw 10 can be made.

An end of the housing 20, opposite that where the saw blade 22 is disposed, includes a curved area that provides a hook 154. If the clamping mechanism 112 is not included or used with the reciprocating pruning saw 10, the severed portion of the limb 24 will fall downward. At times, it may become entangled with other branches that are disposed in the tree below it and therefore, not fall to the ground.

The hook 154 is used to snag and pull the entangled severed portion of the limbs 24 thereby removing them from their entanglement and permitting them to fall to the ground. It is hazardous if they remain in the tree because the severed portion of the limb 24 can, at a later time, suddenly fall toward the ground and act as a spear. If another person or personal property is disposed under the tree at the time the severed portion of the limb 24 falls, the risk of injury or property damage arises.

Other and further modifications are certainly also possible. For example, if desired, a professional or commercial grade version of the reciprocating pruning saw can, of course, include a preferred commercial grade drill 12, either battery or 120 VAC operated as a component part thereof. Similarly, if desired, a higher grade homeowner's version can also include the drill 12 as a part thereof.

If the drill 12 is supplied with the reciprocating pruning saw 10 as a part thereof, it is also possible to further modify the drill 12 so that it supplies the desired rotary power but is fixedly attached (i.e., not detachable with respect) to the reciprocating pruning saw 10. Accordingly, the overall shape of the drill 12 can be modified to suit the aesthetic and ergonomic requirements.

Additionally, markings or a limit control device can be included to limit the amount the reciprocating pruning saw 10 can be retracted or maximally extended sufficient to prevent damage thereto or a separating of the drive shaft 16 from a position of engagement with the driven shaft 16b.

It is preferable that the drill 12 be battery operated for maximum portability of the reciprocating pruning saw 10, however any preferred AC or DC powered type of drill can be used. It is also possible to benefit from the instant disclosure and further modify the reciprocating pruning saw 10 for attachment to a preferred type of gasoline powered motor for increased power and continuous time of operation.

Also, referring again to FIG. 1, top saw teeth 22c are optionally added to the saw blade 22. The top saw teeth 22c are disposed on an edge of the saw blade 22 that is opposite with respect to the saw teeth 22b. The top saw teeth 22c allow the user to raise the reciprocating pruning saw 10 under the limb 24 that is to be severed and lightly score (i.e., cut) the underside thereof prior to making the final cut from the top to the bottom of the limb 24.

The benefit provided by the top saw teeth 22c is that as the limb 24 is progressively being severed the weight of the limb 24 will begin to cause the limb 24 to progressively sag. There is the risk that as the cut nears its end, the limb 24 can tear the lower portion of the limb 24 including the bark away from the underside of the limb 24. This tearing can continue to the tree trunk itself and extend down the tree as the limb 24 continues to fall. This is both unsightly and it also exposes the tree to pest and viral infestation. A clean cut that does not tear any portion of the tree is preferred and the top saw teeth 22c provides this unexpected benefit. Additionally, a clean cut at an end of the limb 24 heals far more easily than one that includes a tear. A skilled operator will determine which of the limbs 24 may require underscoring (i.e., a cutting on a bottom thereof) prior to cutting them from the top down.

If the clamping mechanism 112 is not included and a type of the saw blade 22 that cuts only during the retraction portion of the stroke is used, it is preferred to include a V-shaped abutment 156. The abutment 156 pivots about a retaining pin 158 or bolt that passes through a hole which is provided through the housing 20. The hole provided is also used to secure the clamping mechanism 112 to the housing 20. When the clamping mechanism 112 is used, the center pivot screw 120 passes through the hole provided in the housing. The abutment 156 is useful when cutting especially large limbs 24 by providing a "stop" that the limb 24 can rest upon. It also provides a dual-inclined surface (i.e., a wedge shape) that increasingly urges the saw blade 22 into contact with the limb 24 during a cutting thereof.

If desired, a non-pivoting type of abutment (not shown) that includes a similar profile as that of the abutment 156 can be included as part of the shape of the housing 156 proximate the saw blade 22. It is also preferable to apply a layer of rubber or other type of elastomer on the surface of the abutment 156 (or the modified abutment) and also on the upper jaw 116 and the lower jaw 118 that is in contact with the limb 24 to help prevent a possible marring of the limb 24.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A reciprocating pruning saw, comprising:
    (a) an extensible drive shaft, wherein said extensible drive shaft includes a drive shaft and a driven shaft that are extensible with respect to each other between a non-extended position that includes a minimum overall combined length and a fully-extended position that includes a maximum overall combined length, and wherein said drive shaft and said driven shaft are cooperatively engaged to each other from said non-extended position through said fully-extended position, and wherein said drive shaft and said driven shaft are extensible with respect to each other along a center longitudinal axis of said drive shaft and said driven shaft, and wherein said overall combined length of said drive shaft and said driven shaft is adjustable by urging said drive shaft and said driven shaft longitudinally with respect to each other in either direction without rotation occurring between said drive shaft and said driven shaft around said center longitudinal axis;
    (b) means for converting rotary motion into reciprocal motion, said means for converting attached to a first end of said extensible drive shaft;
    (c) means for attaching a motor to said extensible drive shaft at a second end of said extensible drive shaft that is distally disposed with respect to said first end of said extensible drive shaft;
    (d) means for attaching a saw blade to said means for converting, wherein said saw blade is able to experience said reciprocal motion when said saw blade is attached to said means for converting and when said motor is energized; and
    (e) wherein an upper end of said drive shaft is disposed in said driven shaft, and wherein said upper end of said drive shaft is adapted to move longitudinally in said driven shaft, and including means for transferring rotary motion by said drive shaft to said driven shaft, and wherein said means for transferring rotary motion by said drive shaft to said driven shaft includes an outside diameter of said drive shaft that is less than an inside diameter of said driven shaft, and wherein said drive shaft includes at least one longitudinal flat surface on said upper end of said drive shaft, and a pin that is disposed on said at least one longitudinal flat surface, and wherein said pin includes a longitudinal axis that is in alignment with said longitudinal axis of said drive shaft, and wherein said pin is adapted to roll in either direction along said at least one flat surface sufficient to engage said drive shaft with an interior of said driven shaft and thereby transfer a rotary motion that said drive shaft is experiencing in either a clockwise or a counter-clockwise direction to said driven shaft, and wherein said driven shaft experiences rotation about said center longitudinal axis in the same rotational direction as that of said driven shaft.

2. The reciprocating pruning saw of claim 1 wherein said driven shaft is able to rotate in either a clockwise or a counter-clockwise direction about said center longitudinal axis from said non-extended position through said fully-extended position in response to a corresponding direction of rotation that is experienced by said drive shaft about said center longitudinal axis.

3. The reciprocating pruning saw of claim 1 wherein said at least one flat surface includes three flat surfaces on said drive shaft and wherein said pin includes three pins, and wherein each of said three pins is disposed on a respective one of said three flat surfaces.

* * * * *